United States Patent
Watson et al.

(10) Patent No.: US 12,204,521 B2
(45) Date of Patent: Jan. 21, 2025

(54) TECHNIQUES FOR GENERATING A CONSISTENT VIEW OF AN EVENTUALLY CONSISTENT DATABASE

(71) Applicant: NETFLIX, INC., Los Gatos, CA (US)

(72) Inventors: Daniel Watson, San Francisco, CA (US); Arun Agrawal, San Francisco, CA (US); Charles Smith, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 75 days.

(21) Appl. No.: 16/905,813

(22) Filed: Jun. 18, 2020

(65) Prior Publication Data

US 2021/0397599 A1  Dec. 23, 2021

(51) Int. Cl.
 *G06F 16/23* (2019.01)
 *G06F 11/14* (2006.01)
 *G06F 16/174* (2019.01)
 *G06F 16/178* (2019.01)

(52) U.S. Cl.
 CPC ...... *G06F 16/2365* (2019.01); *G06F 11/1458* (2013.01); *G06F 16/1744* (2019.01); *G06F 16/178* (2019.01); *G06F 2201/80* (2013.01)

(58) Field of Classification Search
 CPC ............. G06F 16/2365; G06F 16/1744; G06F 16/178; G06F 11/1458; G06F 2201/80
 See application file for complete search history.

(56) References Cited

U.S. PATENT DOCUMENTS

| | | | |
|---|---|---|---|
| 6,334,847 B1* | 1/2002 | Fenster | G01S 15/8993 600/443 |
| 10,055,303 B1* | 8/2018 | Kumar | G06F 16/1727 |
| 11,025,688 B1* | 6/2021 | Ijjurouthu | G06F 16/27 |
| 2007/0101186 A1* | 5/2007 | Chen | G06F 11/1456 714/6.11 |
| 2011/0029675 A1* | 2/2011 | Yeow | G06F 11/2041 709/226 |

(Continued)

OTHER PUBLICATIONS

International Search Report for Application No. PCT/US2021/034484 dated Sep. 9, 2021.

*Primary Examiner* — Allen S Lin
(74) *Attorney, Agent, or Firm* — Artegis Law Group, LLP

(57) ABSTRACT

In various embodiments, a consistency application constructs a consistent view of an eventually consistent database. The consistency application determines multiple backup files that are associated with at least one datacenter included in the eventually consistent database and extracts aggregated data from the backup files. The consistency application performs compaction operation(s) on the aggregated data to generate compacted data. Notably, the aggregated data includes at least two replicas for each data item stored in the eventually consistent database, whereas the compacted data includes a different consistent data item for each data item stored in that eventually consistent database. The consistency application generated the consistent view of the eventually consistent database based on the compacted data. Because the consistency application generates the consistent view based on backup files and does not access the eventually consistent database, generating the consistent view does not adversely impact the performance of the eventually consistent database.

20 Claims, 3 Drawing Sheets

(56) References Cited

U.S. PATENT DOCUMENTS

| | | | |
|---|---|---|---|
| 2012/0158662 A1* | 6/2012 | Buragohain | H04L 69/40 707/649 |
| 2013/0218840 A1* | 8/2013 | Smith | G06F 16/2358 707/639 |
| 2015/0032743 A1* | 1/2015 | Agrawal | G06F 40/18 707/736 |
| 2016/0196082 A1* | 7/2016 | Bhardwaj | G06F 3/0619 711/162 |
| 2017/0235754 A1* | 8/2017 | Zhong | G06F 11/1456 707/649 |
| 2017/0358009 A1* | 12/2017 | Shah | G06Q 30/0264 |
| 2018/0300205 A1 | 10/2018 | Sehgal et al. | |
| 2019/0294509 A1 | 9/2019 | Bharadwaj et al. | |

\* cited by examiner

TECHNIQUES FOR GENERATING A CONSISTENT VIEW OF AN EVENTUALLY CONSISTENT DATABASE

BACKGROUND

Field of the Various Embodiments

The various embodiments relate generally to computer science and large-scale data processing and, more specifically, to techniques for generating a consistent view of an eventually consistent database.

Description of the Related Art

Many companies store data items associated with real-time interactions between Internet-based software applications and users in eventually consistent databases. These databases are typically accessed and managed via various database management applications. To ensure the constant availability of an eventually consistent database, despite potential equipment and/or communications failures, the associated database management application typically stores multiple replicas of each data item stored in the eventually consistent database across different groups of nodes, known as "datacenters." Each datacenter usually resides in a different geographic region and handles requests from software applications executing within the region to read and write data items from and to the eventually consistent database. To avoid unnecessary gaps in availability while replicating newly written data items from one datacenter to one or more other datacenters, each datacenter usually is configured to continue responding to access requests, even though there may be temporary inconsistencies between the various replicas of the data items stored across the different datacenters. Until the replication operations involving the newly written data item have completed, any number of the datacenters may inaccurately provide an obsolete data item to a user in response to a read request.

The tradeoff that an eventually consistent database provides between performance and accuracy, described above, is usually acceptable when only users within a given region are accessing a given software application and where that software application executes only within that region. However, the above tradeoff is oftentimes unacceptable for software applications that require accurate and consistent views of data items stored in an eventually consistent database across different regional datacenters at different points in time. For example, to accurately infer trends associated with users over time, an analytics application could require a new and consistent view of an eventually consistent database across all regional datacenters every hour.

In one approach to constructing a consistent view of an eventually consistent database, a read-only datacenter can be added to the overarching eventually consistent database system, where the read-only datacenter is configured to store a single replica of each data item stored within the eventually consistent database. Because the read-only datacenter stores a single replica of each data item, the read-only datacenter provides a single view of the database that is self-consistent by construction. One drawback of this approach, however, is that the existing datacenters end up performing additional operations on an ongoing basis to replicate newly written data items to the read-only datacenter. Performing these additional replication operations increases the loads on the existing datacenters and can therefore increase the latencies associated with accessing data items stored in the eventually consistent database. Another drawback associated with implementing a read-only datacenter is that replicating data items across datacenters is error-prone. If there are any problems with the read-only datacenter, then the read-only datacenter could provide inaccurate data items to users until those problems are resolved.

As the foregoing illustrates, what is needed in the art are more effective techniques for constructing a consistent view of an eventually consistent database.

SUMMARY

One embodiment of the present invention sets forth a computer-implemented method for constructing a consistent view of an eventually consistent database. The method includes determining a plurality of backup files associated with at least one datacenter included in the eventually consistent database; extracting aggregated data from the plurality of backup files, where the aggregated data includes at least two replicas of each data item included in a plurality of data items stored in the eventually consistent database; performing one or more compaction operations on the aggregated data to generate compacted data that includes a different consistent data item for each data item included in the plurality of data items; and generating the consistent view of the eventually consistent database based on the compacted data.

At least one technical advantage of the disclosed techniques relative to the prior art is that the disclosed techniques can be used to generate an accurate and consistent view of an eventually consistent database without negatively impacting overall performance. In particular, the disclosed techniques can be used to generate a consistent view of an eventually consistent database at a given point-in-time from associated backup files without having to directly access the eventually consistent database itself. Therefore, unlike prior art techniques, generating the consistent view does not increase the latencies associated with accessing data items stored in the eventually consistent database. Further, with the disclosed techniques, multiple replicas of each data item are evaluated to determine which replica is the consistent data item that should be included in the consistent view of the eventually consistent database. The accuracy of the consistent view generated by the disclosed techniques is therefore increased relative to views generated by prior-art techniques that may include one or more inaccurate data item replicas. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
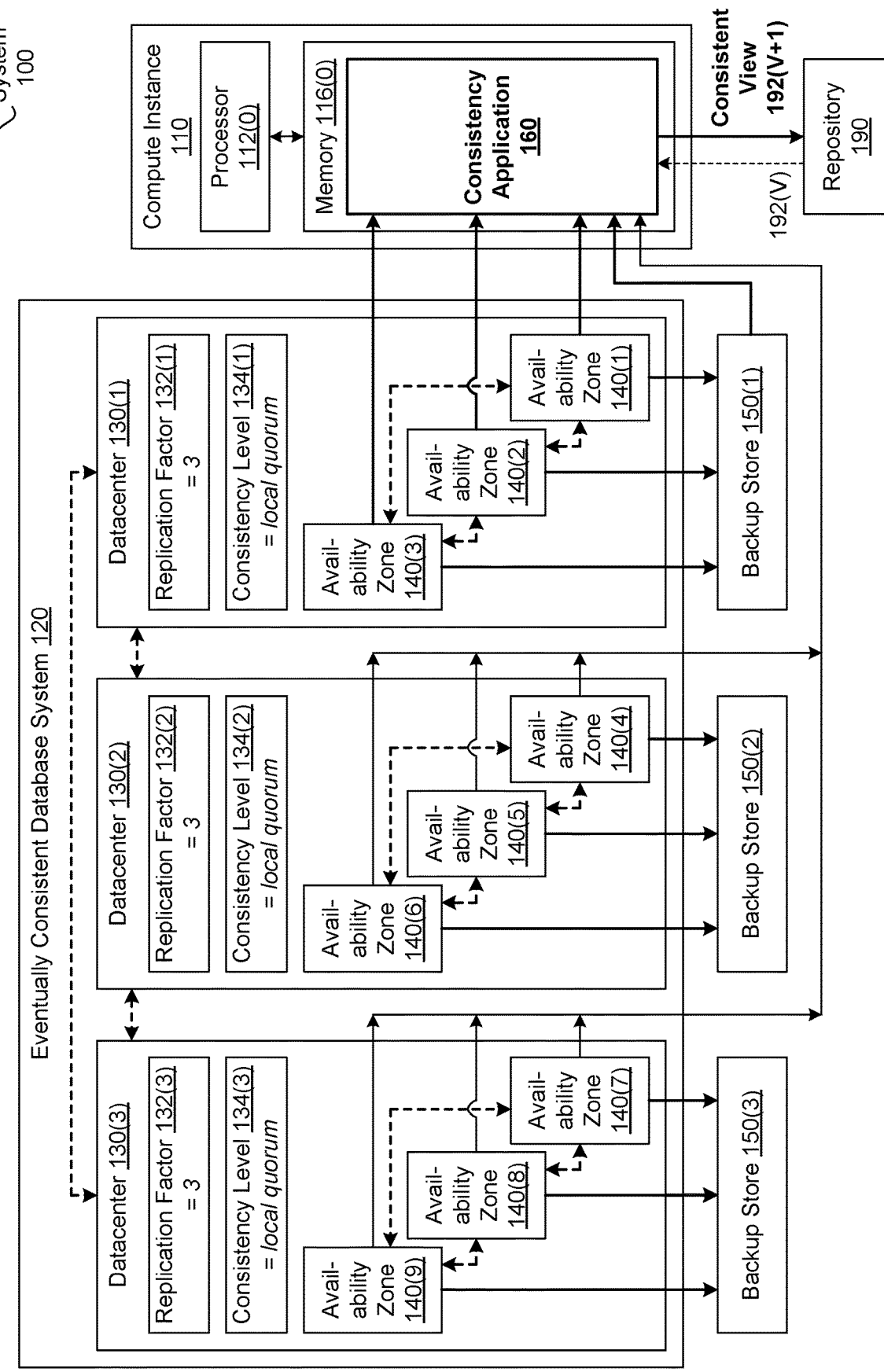
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Many companies store data items associated with real-time interactions between Internet-based software applications and users in eventually consistent databases that include multiple datacenters. Each datacenter usually resides in a different geographic region and includes, without limitation, one or more physically isolated availability zones that each include at least one node. Furthermore, each datacenter preferentially handles requests from software applications executing within the associated region to read and write data items from and to the eventually consistent database. To ensure the constant availability of the eventually consistent database, despite potential equipment and/or communications failures, a database management application stores a different replica of each data item stored in the eventually consistent database within each availability zone. The database management application also ensures that any change to any data item is eventually propagated to all replicas of the data item unless another change is made to the data item. However, to avoid potentially noticeable gaps in availability while replicating newly written data items from one datacenter to one or more other datacenters, each datacenter usually is configured to continue responding to access requests, even though there may be temporary inconsistencies between the various replicas of the data items stored across the different datacenters. Until the replication operations involving the newly written data item have completed, any number of the datacenters may inaccurately provide an obsolete data item to a user in response to a read request.

The tradeoff that an eventually consistent database provides between performance and accuracy, described above, is usually acceptable when only users within a given region are accessing a given software application and where that software application executes only within that region. However, the above tradeoff is oftentimes unacceptable for software applications that require accurate and consistent views of data items stored in an eventually consistent database across different regional datacenters at different points in time. For example, to accurately infer worldwide trends associated with users of a streaming video service that stores user data in an eventually consistent database, an analytics application could periodically require a new view of the associated eventually consistent database that is consistent across all the regional datacenters.

In one approach to constructing a consistent view of an eventually consistent database, a read-only datacenter can be added to the overarching eventually consistent database system, where the read-only datacenter includes a single availability zone. Because the read-only datacenter only includes a single replica of each data item, the read-only datacenter provides a self-consistent view of the eventually consistent database. One drawback of this approach, however, is that maintaining the additional replicas stored in the read-only datacenter increases the loads on the existing datacenters and can therefore increase the time required for any number of the datacenters to access the data items stored in the eventually consistent database. Another drawback associated with implementing a read-only datacenter is that if there are any problems replicating data items to the read-only datacenter, then the read-only datacenter could provide inaccurate data items to users until those problems are resolved. With the disclosed techniques, however, a consistent view of the eventually consistent database is generated based on associated backup files without perturbing the eventually consistent database.

In various embodiments, a backup application periodically (e.g., every twenty-four hours) causes a database management application referred to herein as a "database driver" to take at least approximately synchronized snapshots of each node included in the eventually consistent database. The backup application uploads the resulting snapshot files to backup store(s) that are external to the eventually consistent database system. Optionally, the backup application also causes the database driver to perform incremental backups of each of the nodes. The backup application uploads any resulting incremental files to the backup store(s).

Notably, when uploading a backup file (i.e., a snapshot files or an incremental file) to a backup store, the backup application transmits associated backup messages to the consistency application. The backup messages allow the consistency application to determine whether the backup file has successfully uploaded to the backup store at any given point-in-time. Based on the backup messages associated with the various backup files, the consistency application updates a backup file list in real-time. Each entry in the backup file list is associated with a different backup file and specifies, without limitation, a file identifier, the associated node, an associated timestamp, and an associated status (e.g., available or unavailable).

The consistency application is configured to generate a new consistent view of the eventually consistent database at any number of checkpoint times (e.g., every hour). At each checkpoint time, the consistency application selects a subset of the backup files specified in the backup file list. More specifically the consistency application selects a subset of the backup files that allows the consistency application to generate a specified type of consistent view of the eventually consistent database at the checkpoint time.

To generate a "local" consistent view of the eventually consistent database at the checkpoint time, the consistency application selects a majority of the availability zones included in one of the datacenters included in the eventually consistent database. The consistency application then selects the backup files for all the nodes included in the selected availability zones that were generated during or after the last synchronized snapshots as per the backup file list. By contrast, to generate a "global" consistent view of the eventually consistent database at the checkpoint time, the consistency application selects a larger set of backup files that allow the consistency application to generate a local consistent view for each of the datacenters included in the eventually consistent database.

For example, suppose that the eventually consistent database included three datacenters, each datacenter included three availability zones, and each availability zone included 33 nodes. To generate the local consistent view, the consistency application would select one of the three datacenters and then select any two of the three availability zones included in the selected datacenter. The consistency application would select the subset of the backup files generated during or since the last synchronized snapshots for the 66 nodes included in the selected availability zones. To generate the global consistent view, for each of the three datacenters, the consistency application would select two of the three availability zones included in the datacenter. The consistency application would then select the subset of the backup files generated during or since the synchronized snapshots for the 198 nodes included in the selected availability zones.

The consistency application aggregates the values for the replicas specified in the selected backup files to generate aggregated data that specifies the most recent value for each replica of each data item. For each data item included in the eventually consistent database, the consistency application generates a consistent data item that is equal to one of the replicas of the data item. To generate the consistent data item for a particular data item, the consistency application emulates at least a portion of the logic that the eventually consistent database system implements for resolving inconsistencies between multiple replicas of a data item. For example, when generating a local consistent view, if a majority of the replicas of a particular data item share a single value, then the consistent database could set the associated consistent data item equal to the single value. Otherwise, the consistent database could set the associated consistent data item equal to the value of the replica that was last written to the eventually consistent database. Subsequently, the consistency application performs any number (including zero) of conversion operations to generate a consistent view of the database that specifies the consistent data items in a format that is compatible with any number and/or types of big data tools, such as Cassandra, Hadoop, Hive, etc.

At least one technical advantage of the disclosed techniques relative to the prior art is that the consistency application can be used to generate an accurate and consistent view of an eventually consistent database at any given point-in-time without adversely impacting users. Unlike prior art techniques, because the consistency application generates the consistent view of the eventually consistent database based on backup files, generating the consistent view does not increase the latencies associated with accessing data items stored in the eventually consistent database. Further, because the consistency application evaluates multiple replicas of each data item to determine which replica is the consistent data item that should be included in the consistent view, the accuracy of the consistent view is increased relative to views generated by prior-art techniques that may include one or more obsolete replicas. These technical advantages provide one or more technological advancements over prior art approaches.

System Overview

FIG. 1 is a conceptual illustration of a system 100 configured to implement one or more aspects of the various embodiments. As shown, the system 100 includes, without limitation, a compute instance 110, an eventually consistent database system 120, backup stores 150(1)-150(3), and a repository 190. For explanatory purposes, multiple instances of like objects are denoted with reference numbers identifying the object and parenthetical alphanumeric character(s) identifying the instance where needed.

In alternate embodiments, the system 100 may include, without limitation, any number of compute instances 110, any number of eventually consistent database systems 120, any number of backup stores 150, and any number of repositories 190 in any combination. In some alternate embodiments, the system 100 may include any number and/or types of storage resources in addition to or instead of the backup stores 150 and/or the repository 190.

Any number of the components of the system 100 may be distributed across multiple geographic locations or implemented in one or more cloud computing environments (i.e., encapsulated shared resources, software, data, etc.) in any combination. In particular, each compute instance 110 may be implemented in a cloud computing environment, implemented as part of any other distributed computing environment, or implemented in a stand-alone fashion.

As shown, the compute instance 110 includes, without limitation, a processor 112(0) and a memory 116(0). The processor 112(0) may be any instruction execution system, apparatus, or device capable of executing instructions. For example, the processor 112(0) could comprise a central processing unit, a graphics processing unit, a controller, a micro-controller, a state machine, or any combination thereof. The memory 116(0) stores content, such as software applications and data, for use by the processor 112(0) of the compute instance 110. In alternate embodiments, each of any number of compute instances 110 may include any number of processors 112 and any number of memories 116 in any combination. In some alternate embodiments, any number of the compute instances 110 (including one) may provide a multiprocessing environment in any technically feasible fashion.

The memory 116(0) may be one or more of a readily available memory, such as random access memory, read only memory, floppy disk, hard disk, or any other form of digital storage, local or remote. In some embodiments, a storage (not shown) may supplement or replace the memory 116(0). The storage may include any number and type of external memories that are accessible to the processor 112 (0). For example, and without limitation, the storage may include a Secure Digital Card, an external Flash memory, a portable compact disc read-only memory, an optical storage device, a magnetic storage device, or any suitable combination of the foregoing.

In general, each compute instance 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem The eventually consistent database system 120 may be any type of system that includes, without limitation, an eventually consistent database and any number and/or types of database management applications that manage the eventually consistent database. As referred to herein, an eventually consistent database includes, without limitation, multiple replicas of any number of data items for which the associated database management application(s) enforce an eventual consistency model. In an eventual consistency model, any change to any data item is eventually propagated to all replicas of the data item unless another change is made to the data item.

Some examples of database systems that can be configured as the eventually consistent database system 120 include, without limitation, Apache Cassandra®, MongoDB, and CouchDB. Typically, the eventually consistent database system 120 defines the type(s) and/or structures of data items that are replicated throughout the eventually consistent database. For instance, in some embodiments Apache Cassandra® is configured to implement the eventually consistent database system 120 and each data item is a different row. Consequently, the associated eventually consistent database includes, without limitation, multiple replicas of each row.

As shown, in some embodiments, the eventually consistent database system 120 includes, without limitation, datacenters 130(1)-130(3). As depicted with dotted arrows, the datacenters 130(1)-130(3) are interconnected. In alternate embodiments, the eventually consistent database system 120 may include, without limitation, any positive number of datacenters 130. Each of the datacenters 130 may be implemented and interconnected in any technically feasible fashion.

In some embodiments, each of the datacenters 130 encapsulates any amount and type of computing resources that are associated with a different geographical region. For instance, in some embodiments, each of the datacenters 130 is implemented in Amazon Web Services ("AWS") and includes, without limitation, Amazon Elastic Compute Cloud instances, networking, storage, and security resources. In the same or other embodiments, each of the datacenters 130 is deployed in a different AWS region. For example, the datacenter 130(1) could be deployed in the us-west-1 AWS region, the datacenter 130(2) could be deployed in the us-east-1 AWS region, and the datacenter 130(3) could be deployed in the eu-central-1 AWS region.

As shown, in some embodiments, each of the datacenters 130 includes, without limitation, any number of available zones 140, a replication factor 132, and a consistency level 134. Although not shown in FIG. 1, each of the availability zones 140 includes, without limitation, any number of nodes that, together, store a single replica for each of the data items. As described in greater detail in conjunction with FIG. 2, each node includes, without limitation, one or more processors 112, one or more memories 116, and a node store that stores a single replica of each of a subset of the data items.

As shown, in some embodiments, the availability zones 140(1)-140(3) are included in the datacenter 130(1), the availability zones 140(4)-140(6) are included in the datacenter 130(2), and the availability zones 140(7)-140(9) are included in the datacenter 130(3). Consequently, each of the datacenters 130(1)-130(3) store three replicas of each data item and the eventually consistent database therefore stores nine replicas of each data item. In some embodiments, each of the availability zones 140 within a given datacenter 130 is an isolated location within the associated geographical region. For example, the datacenter 130(1) could be deployed in the us-west-1 AWS region and the availability zones 140(1)-140(3) included in the datacenter 130(1) could be deployed in the us-west-1a, us-west-1b, us-west-1c AWS availability zones, respectively.

In some embodiments, each of the datacenters 130 is also referred to as a "replication group." In alternate embodiments, each of the datacenters 130 may include any number of availability zones 140 that are interconnected in any technically feasible fashion. In some alternate embodiments, each of the datacenters 130 may include a different number of availability zones 140. In the same or other alternate embodiments, each of the datacenters 130 and each of the availability zones 140 may be implemented in any technically feasible fashion.

The replication factor 132 included in each datacenter 130 specifies the total number of replicas of each data item that are stored across the datacenter 130. For each datacenter 130, the replication factor 132 is therefore equal to the total number of availability zones 140 included in the datacenter 130. For the embodiment depicted in FIG. 1, the replication factor 132 included in each of the datacenters 130(1)-130(3) is equal to 3 (depicted in italics). In alternate embodiments, the replication factor 132 may be any positive integer and may vary across the datacenters 130.

In some embodiments, each node is configured to receive and respond to access requests associated with the eventually consistent database. As referred to here, an "access request" is a request from a software application to execute an access operation, and an "access operation" is a read from or a write to the eventually consistent database. Typically, each node preferentially receives and responds to access requests from software applications executing within the same geographical region. For example, the datacenter 130(1) could be deployed in the us-west-1 AWS region and the nodes included in the availability zones 140(1)-140(3) would preferentially receive and respond to access requests from software applications executing within the us-west-1 AWS region.

After receiving a request to write to an eventually consistent database, the receiving node may coordinate with any number of other nodes in any number of the availability zones 140 and any number of datacenters 130 to update any number of replicas. Similarly, after receiving a request to read from an eventually consistent database, the receiving node may coordinate with any number of other nodes in any number of the availability zones 140 and any number of datacenters 130 to evaluate any number of replicas of a data item before determining the data item to specify in the response. In some embodiments, after each node successfully reads from or writes to an associated replica as part of an access operation, the node acknowledges the access operation.

In some embodiments, the consistency level 134 included in each datacenter 130 specifies the minimum number of nodes in the datacenter 130 that must acknowledge an access operation before the access operation can be considered successful. The consistency level 134 therefore specifies the minimum number of replicas of a data item within the datacenter 130 that are required to be updated before a write to the data item completes. Furthermore, since each availability zone 140 stores a different set of replicas for the data items, the consistency level 134 specifies the minimum number of availability zones 140 in the associated datacenter 130 that must acknowledge an access operation before the access operation can be considered successful.

The consistency level 134 may be specified in any technically feasible fashion. For instance, in some embodiments, the consistency level 134 may be specified as an integer and/or as a computed value. As shown in italics, the consistency level 134 for each of the datacenters 130(1)-130(3) is specified as a local quorum. As referred to herein a "local quorum" for a given datacenter 130 is the minimum number of availability zones 140 that constitutes a majority of the availability zones 140 included in the datacenter 130. The local quorum for a given datacenter 130 may be computed via the following equation (1):

$$\text{local quorum} = \text{round down}((\text{replication factor 132})/2 + 1) \quad (1)$$

As per equation (1), because the replication factor 132 included in each of the datacenters 130(1)-130(3) is equal to 3, the consistency level 134 for each of the datacenters 130(1)-130(3) is equal to 2. Notably, when the consistency level 134 is specified as a local quorum, responding to an access request associated with a given data item involves successfully accessing a majority of the replicas of the data item that are stored in the datacenter 130 that received the access request. Because responding to the access request does not involve communicating with the other datacenters 130, the access request does not incur latencies associated with performing access and/or validation operations across multiple datacenters 130.

Figure 2:
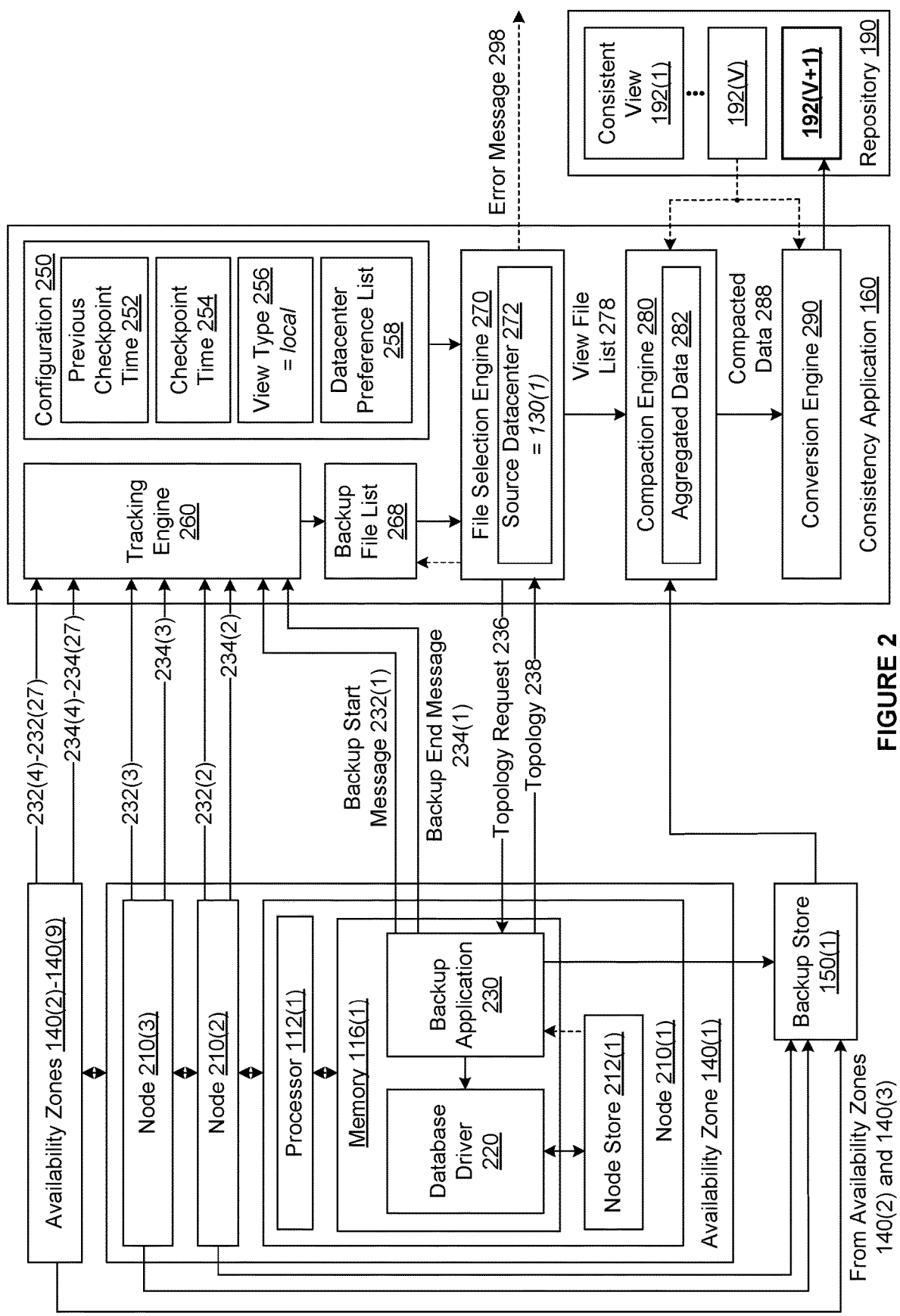
FIG. 2 is a more detailed illustration of the consistency application of FIG. 1, according to various embodiments.

For explanatory purposes only, various concepts and techniques are described herein in context of exemplary embodiments that include, without limitation, the eventually consistent database system 120 depicted in FIG. 1 and the availability zones 140 depicted in greater detail in FIG. 2. However, as persons skilled in the art will recognize, the concepts and techniques can be modified to apply to any type of database for which any type of eventually consistent model is enforced in any technically feasible fashion.

As described in detail previously herein, an eventually consistent database provides a tradeoff between performance and accuracy that is oftentimes unacceptable for software applications that require accurate and consistent views of data items stored in the eventually consistent database at different points in time. In one approach to constructing a consistent view of an eventually consistent database, a read-only datacenter can be added to the overarching eventually consistent database system, where the read-only datacenter is configured to store a single replica of each data item stored within the eventually consistent database. Therefore, the read-only datacenter provides a single view of the eventually consistent database. One drawback of this approach, however, is that performing the additional replication operations to update the read-only datacenter increases the loads on the existing datacenters and can therefore increase the latencies associated with accessing data items stored in the eventually consistent database. Another drawback associated with implementing a read-only datacenter is that if there are any problems associated with replicating data items to the read-only datacenter, then the read-only datacenter could provide inaccurate data items to users until those problems are resolved.

Generating Consistent Views Based on Backup Files

To address the above problems, the system 100 includes, without limitation, a consistency application 160 that generates one or more consistent views 192 of the eventually consistent database based on backup files (not shown) associated with the eventually consistent database. The backup files include, without limitation, any number of snapshot files and any number (including zero) of incremental backup files. Each backup file is associated with a node, a timestamp, and optionally any amount and type of metadata.

Snapshot files having the same timestamp correspond to snapshots taken of the nodes at the same time and, together, specify the replicas stored in the nodes at the timestamp. Each incremental backup file specifies, without limitation, any number and type of changes to the replicas stored on the associated node that occurred since the last backup (e.g., snapshot or incremental backup) of the node.

As described in greater detail in conjunction with FIG. 2, in some embodiments, the backup files are generated by a backup application. A different instance of the backup application executes on each of the nodes included in the eventually consistent database system 120. Each instance of the backup application ensures that the backup files for the associated node are uploaded to one of the backup stores 150 and sends messages to the consistency application 160 indicating when each upload begins and ends.

Each of the backup stores 150 may consist of any amount and/or type of storage resources and may be implemented in any technically feasible fashion. As shown, in some embodiments, the system 100 includes, without limitation, the backup stores 150(1)-150(3) that are associated with the datacenters 130(1)-130(3), respectively. The instances of the backup application upload the backup files for all the nodes across all the availability zones 140 included in the datacenters 130(1)-130(3) to the backup stores 150(1)-150(3), respectively.

In some embodiments, the backup store 150($x$) (where x is an integer) and the datacenter 130($x$) are associated with the same geographical region. For instance, in some embodiments, each of the backup stores 150 is a different bucket (i.e., logical unit of storage) in Amazon Simple Storage Solution ("S3"), and the backup store 150($x$) is in the same AWS region as the datacenter 130($x$).

As shown, in some embodiments, the consistency application 160 resides in the memory 116(0) of the compute instance 110 and executes on the processor 112(0) of the compute instance 110. The consistency application 160 constructs any number of the consistent views 192, where each of the consistent views 192 represents the data items stored in the eventually consistent database at a different point-in-time.

More specifically, each of the consistent views 192 includes, without limitation, a different consistent data item for each of the data items stored in the eventually consistent database at the associated point-in-time. In each consistent view 192, each consistent data item is equal to one of the replicas of the associated data item at the point-in-time associated with the consistent view.

For explanatory purposes only, the functionality of the consistency application 160 is depicted and described in the context of generating the consistent view 192(V+1), where V is the total number of consistent views 192 that the consistency application 160 has previously generated. The consistency application 160 may determine when to generate the consistent view 192(V+1) in any technically feasible fashion. For instance, in some embodiments, the consistency application 160 periodically (e.g., every hour) constructs the consistent view 192(V+1).

The consistency application 160 may generate the consistent view 192(V+1) based, at least in part, on any number and type of consistency criteria, consistent rules, consistency algorithms, etc. For instance, in some embodiments, a view type specifies whether the consistent view 192(V+1) is to satisfy a global consistency criterion or a local consistency criterion. As referred to herein, a globally consistent view of the eventually consistent database is consistent across all the geographical regions in which the datacenters 130 included in the eventually consistent database reside. By contrast, a locally consistent view of the eventually consistent database is consistent with respect to one of the datacenters 130. In some embodiments, each of the datacenters 130 is located in a different geographical region and a locally consistent view is also a regionally consistent view that is consistent across the geographical region in which the associated datacenter 130 is located.

In operation, the consistency application 160 selects a subset of the availability zones 140 based on the view type. The consistency application 160 then generates the consistent view 192(V+1) based on backup files for all the nodes included in the selected availability zones 140. In some embodiments, including the embodiment depicted in FIG. 1, the view type is local. When the view type is local, the consistency application 160 selects a local quorum of the availability zones 140 for one of the datacenters 130 included in the eventually consistent database system 120. As described in detail previously herein, a local quorum for a given datacenter 130 is the minimum number of availability zones 140 that constitutes a majority of the availability zones 140 included in the datacenter 130. The local quorum for each of the datacenters may be computed using equation (1). When the view type is local, because the consistency application 160 generates the consistent view 192(V+1) based on a single datacenter 130, the consistent view 192(V+1) is regionally consistent for the region associated with the datacenter 130.

For explanatory purposes only, FIG. 1 depicts a scenario in which the consistency application 160 selects two of the availability zones 140(1)-140(3). As depicted with a thick arrow, the consistency application 160 reads the backup files for the selected availability zones 140 from the backup store 150(1) when generating the consistent view 192(V+1). Notably, the consistency application 160 accesses neither the backup store 150(2) nor the backup store 150(3) when generating the consistent view 192(V+1). Because the consistency application 160 generates the consistent view 192(V+1) based on the datacenter 130(1), the consistent view 192(V+1) is regionally consistent for the region in which the datacenter 130(1) is located.

In some alternate embodiments, the view type is global. When the view type is global, the consistency application 160 selects a local quorum of the availability zones 140 for each of the datacenters 130 included in the eventually consistent database system 120. Notably, when the view type is global, the consistent view 192(V+1) is a globally consistent view of the eventually consistent database.

For explanatory purposes only, suppose that for the embodiment depicted in FIG. 1, the view type was changed from local to global before the consistency application 160 generated the consistency view 192(V+2). The consistency application 160 would select any two of the availability zones 140(1)-140(3), any two of the availability zones 140(4)-140(6), and any two of the availability zones 140(7)-140(9). Although not shown, the consistency application 160 would read a subset of the backup files from each of the backup stores 150(1)-150(3) when generating the consistent view 192(V+2).

For each data item, the consistency application 160 determines a consistent data item from the multiple replicas of the data item that are stored in the selected availability zones 140 as per the backup files. The consistency application 160 may perform any number and type of operations on the replicas of a given data item to determine the consistent data item. For instance, in some embodiments, the consistency application 160 determines the total number of replicas of the data item that share each value. If one of the values is shared by more of the replicas than the other values, then the consistency application 160 sets the consistent data item equal to the value. Otherwise, the consistency application 160 sets the consistent data item equal to the value of the replica that was written most recently.

As described in greater detail in conjunction with FIG. 2, the consistency application 160 generates the consistent view 192(V+1) based on the consistent data items. For each data item, the consistent view 190(V+1) specifies the consistent data item instead of multiple replicas of the data item. The consistency application 160 may generate and/or optimize the consistent view 190(V+1) in any technically feasible fashion.

As shown, the consistency application 160 stores the consistent view 190(V+1) in the repository 160. The repository 160 may be any size and/or type of storage that is accessible to at least one other software application (e.g., an analytics application) and may be implemented in any technically feasible fashion. For instance, in some embodiments, the repository 160 is a bucket in Amazon S3. Notably, the consistent views 190(1)-190(N+1) stored in the repository 160 provide a history of the eventually consistent database at different points in time.

In alternate embodiments, the consistency application 160 may determine the consistent data items and generate the consistent view 190(N+1) in any technically feasible fashion based on at least a subset of the backup files and any amount (including none) and/or type of additional data. For instance, in some alternate embodiments, the consistency application 160 uses the consistent data items associated with the consistent view 192(V) to reduce the number of operations required to compute the consistent data items for the consistent view 192(V+1). In the same or other alternate embodiments, and as depicted with a dotted arrow, the consistency application 160 may retrieve any number of the consistent views 192(1)-192(V) from the repository 190.

For explanatory purpose only, descriptions of various embodiments are presented for purposes of illustration in the context of the eventually consistent database system 120 depicted in FIG. 1 but are not intended to be exhaustive or limited to the embodiments disclosed. Many modifications and variations will be apparent to those of ordinary skill in the art without departing from the scope and spirit of the described embodiments. In particular, the scope of the embodiments includes any techniques for generating consistent views 192 based on any amount and type of backup data for any type of eventually consistent database in any technically feasible fashion.

Note that the techniques described herein are illustrative rather than restrictive and may be altered without departing from the broader spirit and scope of the invention. Many modifications and variations on the functionality provided by the consistency application 160, the eventually consistent database system 120, the datacenters 130, and the availability zones 140 will be apparent to those of ordinary skill in the art without departing from the scope and spirit of the described embodiments.

It will be appreciated that the system 100 shown herein is illustrative and that variations and modifications are possible. The connection topology, including the location and arrangement of the compute instance 110, the eventually consistent database system 120, the datacenters 130, the availability zones, the backup stores 150, and the repository 190 may be modified as desired. In certain embodiments, one or more components shown in FIG. 1 may not be present.

In some embodiments, any portion of the functionality provided by the consistency application 160, the eventually consistent database system 120, the datacenters 130, and the availability zones 140 as described herein may be integrated into or distributed across any number of software applications (including one) and/or any number of compute instances 110 (including one).

Consistency Application for Generating Consistent Views

FIG. 2 is a more detailed illustration of the consistency application 160 of FIG. 1, according to various embodiments. Referring to FIG. 1 and for explanatory purposes only, FIG. 2 depicts the availability zones 140(1)-140(9) but not the datacenters 130(1)-130(3). As described in FIG. 1, the availability zones 140(1)-140(3) are included in the datacenter 130(1), the availability zones 140(4)-140(6) are included in the datacenter 130(2), and the availability zones 140(7)-140(9) are included in the datacenter 130(3).

As shown, the availability zone 140(1) includes, without limitation, an interconnected set of nodes 210(1)-210(3). The nodes 210(1)-210(3) may be interconnected in any technically feasible fashion. Although not shown, the nodes 210(4)-210(27) are evenly distributed across the availability zones 140(2)-140(9). For example, the availability zone 140(2) includes, without limitation, the interconnected set of the nodes 210(4)-210(6). In another example, the availability zone 140(9) includes, without limitation, the interconnected set of the nodes 210(25)-210(27).

In alternate embodiments, each of any number of availability zones 140 includes, without limitation an interconnected set of any number of the nodes 210. In some alternate embodiments, the total number of the nodes 210 included a given availability zone 140 may differ from the total number of the nodes 210 included in any number of other availability zones 140.

As shown, the node 210(1) includes, without limitation, the processor 112(1), the memory 116(1), and a node store 212(1). The node store 212(1) includes, without limitation, any number, sizes, and/or types of non-volatile storage and stores replicas of the subset of data items assigned to the node 210(1). As also shown, an instance of a database driver 220 and an instance of a backup application 230 reside in the memory 116(1) of the node 210(1) and execute on the processor 112(1) of the node 210(1).

Although not shown, each of the nodes 210(x), where x is an integer between 2 and 27, includes, without limitation, the processor 112(x), the memory 116(x), and the node store 212(x) that stores replicas of the subset of data items assigned to the node 210(x). Furthermore, an instance of the database driver 220 and an instance of the backup application 230 reside in the memory 116(x) of the node 210(x) and execute on the processor 112(x) of the node 210(x). In alternate embodiments, each of the nodes 210 may include any number and/or type of processors 112 and/or memories 116.

The database driver 220 manages the eventually consistent database included in the eventually consistent database system 120 in a distributed fashion. For a given node 210, the associated instance of the database driver 220 manages the node-specific replicas via the associated node store 212.

The backup application 230 performs, without limitation, backup and recovery operations for the eventually consistent database. For a given node 210, the associated instance of the backup application 230 executes alongside the associated instance of the database driver 220. For each node 210, the associated instance of the backup application 230 configures the associated instance of the database driver 220 to create snapshots of the node 210 as per a single, global snapshot schedule in any technically feasible fashion.

For instance, in some embodiments, Apache Cassandra® is configured to implement the eventually consistent database system 120. Periodically (e.g., every twenty-four hours), the instances of the backup application 230 cause the instances of the database drivers 220 to execute nodetool snapshot commands in Apache Cassandra to create snapshots of the nodes 210. Importantly, for each scheduled global snapshot, the nodetool snapshot commands generate the snapshots for the nodes 210 at the same time.

Each snapshot includes, without limitation, any number of snapshot files that, together, specify the replicas stored in the associated node 210 at the time that the snapshot was taken. Each of the snapshot files included in a given snapshot of a given node 210 is associated with the node 210 and a timestamp indicating the time at which the snapshot was taken. In some embodiments, each snapshot may also be associated with any amount and type of metatdata in any technically feasible fashion. For instance, in some embodiments each snapshot may be associated with a snapshot metadata file that includes, without limitation, a list of the snapshot files included in the snapshot.

For each of the nodes 210, after the associated instance of the database driver 220 generates a new snapshot, the associated instance of the backup application 230 transmits a backup start message 232 to the consistency application 160. The instance of the backup application 230 then initiates an upload of the snapshot files included in the snapshot. The upload stores snapshot files in the backup store 150 associated with the node 210. When the upload of the snapshot files is complete, the instance of the backup application 230 transmits a backup end message 234 to the consistency application 160.

Together, the backup start messages 232 and the backup start messages 234 enable the consistency application 160 to determine the snapshot files that are included in each snapshot, the associated timestamp, and whether all the snapshot files included in each snapshot are available for retrieval from the associated backup store 150. For instance, in some embodiments, the backup start message 232 and/or the backup end message 234 associated with a given snapshot specify a list of the snapshot files that are included in the snapshot.

In alternate embodiments, each instance of the backup application 230 may transmit any number and/or type of backup start messages 232 and any number and/or type of backup end messages 234 for each snapshot. For instance, in some alternate embodiments, each instance of the backup application 230 transmits a different backup start message 232 to the consistency application 160 before uploading each snapshot file and a different backup end message 234 to the consistency application 160 after the upload of each snapshot file is complete.

Each instance of the backup application 230 may transmit the backup start messages 232 and the backup end messages 234 to the consistency application 160 in any technically feasible fashion. For instance, in some embodiments, the backup application 230 uses Amazon Simple Notification Service to transmit messages (including the backup start messages 232 and the backup end message 234) to the consistency application 260.

In some embodiments, each instance of the backup application 230 configures the associated instance of the database driver 220 to perform incremental backups for the associated node 210. For each node 210, each incremental backup generates any number of incremental files that, together, specify any number and type of changes to the replicas stored on the node 210 that have occurred since the last backup (e.g., snapshot or incremental backup) of the node 210. Each of the incremental files resulting from a given incremental backup of a given node 210 is associated with the node 210 and a timestamp indicating the time at which the incremental backup was performed.

Each instance of the backup application 230 periodically identifies any new incremental file(s), transmits backup start message(s) 232 to the consistent application 160, and begins to upload the incremental file(s) to the associated backup store 150. When the upload of the incremental file(s) is complete, the instance of the backup application 230 transmits backup end message(s) 234 to the consistency application 160.

As noted previously in conjunction with FIG. 1, for explanatory purposes only, the functionality of the consistency application 160 is depicted and described in the context of generating the consistent view 192(V+1), where V is the total number of consistent views 192 that the consistency application 160 has generated thus-far. As shown, the consistency application 160 includes, without limitation, a configuration 250, a tracking engine 260, a backup file list 268, a file selection engine 270, a compaction engine 280, and a conversion engine 290.

The configuration 250 includes, without limitation, a previous checkpoint time 252, a checkpoint time 254, a view type 256, and a datacenter preference list 258. In alternate embodiments, the configuration 250 may include any amount and type of information that is relevant to generating the consistent views 192 instead of or in addition any number of the previous checkpoint time 252, the checkpoint time 254, the view type 256, or the datacenter preference list 258.

If the consistency application 160 has not yet generated any consistent views 192 (i.e., V is equal to zero), then the previous checkpoint time 252 specifies an initial time. Otherwise, the previous checkpoint time 252 specifies the time at which the consistency application 160 generated the consistent view 192(V). The checkpoint time 252 specifies the time at which the consistency application 160 is scheduled to generate the consistent view 192(V+1).

The consistency application 160 may determine the checkpoint time 252 in any technically feasible fashion. For instance, in some embodiments, the consistency application 160 is configured to generate a new consistent view 192 every hour. After generating the consistent view 192(V), the consistency application 160 sets the previous checkpoint time 252 equal to the checkpoint time 254 and then adds an hour to the current time.

As described previously in conjunction with FIG. 1, in some embodiments, the view type 256 specifies a consistency level for the consistent view 192(V+1). If the view type 256 is local, then the consistency application 160 generates the consistent view 192(V+1) that is regionally consistent. If the view type 256 is global, then the consistency application 160 generates the consistent view 192(V+1) that is globally consistent.

The datacenter preference list 258 specifies the order in which the consistency application 160 is to consider the datacenters 130 when the view type 256 is local. For example, if the datacenter preference list 256 specifies "the datacenter 130(1), the datacenter 130(3), the datacenter 130(2)," then the consistency application 160 preferentially generates the consistency view 192(V+1) that is consistent across the region associated with the datacenter 130(1).

In alternate embodiments, the configuration 250 may include, without limitation, any amount and/or type of data instead of or in addition to the view type 256 and/or the datacenter preference list 258 that influences how the consistency application 160 generates the consistent views 190.

As shown, the tracking engine 260 continually updates the backup file list 268 based on the backup start messages 232 and the backup end messages 234 received from the availability zones 140. In operation, the consistency application 160 or the tracking engine 260 initializes the backup file list 268 to an empty file. Subsequently, as the tracking engine 260 receives each backup start message 232, the tracking engine 260 adds a new entry to the backup file list 268 for each backup file specified via the backup start message 232.

The new entry for a given backup files specifies, without limitation, a file identifier, the associated node 210, the associated timestamp, and an associated status of "unavailable." As the tracking engine 260 receives each backup end message 234, the tracking engine 260 updates the backup file list 268 to specify a status of "available" for each backup file specified via the backup end message 234. In alternate embodiments, the backup file list 268 may specify any amount and/or type of data associated with the backup files in any technically feasible fashion.

When the current time is equal to the checkpoint time 254, the file selection engine 270 transmits a topology request 236 to one of the instances of the backup application 230. In response, the instance of the backup application 230 transmits a topology 238 associated with the eventually consistent database to the file selection engine 270. The topology 238 specifies the hierarchical organization of the nodes 210 that store the replicas of the data items stored in the eventually consistent database. For instance, in some embodiments, the topology 238 specifies, without limitation, the number and arrangement of each of the datacenters 130, the availability zones 140, and the nodes 210 within the eventually consistent database system 120.

For explanatory purposes only, and as depicted in italics, the view type 256 for the embodiment depicted in FIG. 2 is local. As described in detail previously herein in conjunction with FIG. 1, when the view type 256 is local, the file selection engine 270 selects a local quorum of the availability zones 140 for one the datacenters 130 included in the eventually consistent database system 120. More specifically, the file selection engine 270 selects a local quorum of the availability zones 140 for a source datacenter 272. The file selection engine 270 may determine the source datacenter 272 from the datacenters 130 in any technically feasible fashion.

For instance, in some embodiments, the file selection engine 270 determines the source datacenter 272 based on the topology 238, the datacenter preference list 258, and (optionally) the backup file list 268. More specifically, the file selection engine 270 selects the first datacenter 130 in the datacenter preference list 258 for which all the availability zones 140 are available (e.g., communicating and generating backup files as scheduled). For explanatory purpose only, and as depicted in italics, the file selection engine 270 sets the source datacenter 272 equal to the datacenter 130(1).

Subsequently, the file selection engine 270 attempts to select a local quorum of the availability zones 140 in the source datacenter 272 that have complete and up-to-date backup files available. As referred to herein, a given availability zone 150 has complete and up-to-date backup files available when up-to-date backup files are available for all the nodes 210 included in the availability zone 140. The file selection engine 270 may attempt to select the local quorum in any technically feasible fashion. For instance, in some embodiments, the file selection engine 270 determines the availability zones 140 in the source datacenter 272 and the associated nodes 210 based on the topology 238. The file selection engine 270 then uses equation (1) to compute the local quorum for the source datacenter 272.

To determine whether the backup files are up-to-date for a given node 210, the file selection engine 270 analyzes the backup file list 268 based on any number and/or type of heuristics, rules, algorithms, etc. For instance, in some embodiments, if the backup file list 268 does not include any snapshot files that are associated with both the node 210(1) and the timestamp of the last scheduled snapshot, then the file selection engine 270 determines that up-to-date backup files are not available for the node 210(1). In the same or other embodiments, if the backup file list 268 includes an entry indicating that a backup file for the node 210(1) is unavailable and, based on the timestamp, the upload of the backup file had enough time to complete, then the file selection engine 270 determines that up-to-date backup files are not available for the node 210(1).

If the file selection engine 270 determines that complete and up-to-date backup data is available for fewer than a quorum of the availability zones 140 in the source datacenter 272, then the file selection engine 270 transmits an error message 298 to any number and type of software applications. The consistency application 160, then updates the checkpoint time 254 without generating a new consistent view 190.

Otherwise, the file selection engine 270 selects a quorum of the availability zones 140 from the availability zones 140 for which complete and up-to-date backup data is available. Subsequently, for each of the nodes 210 included in each of the selected availability zones 140, the file selection engine 270 selects the entries in the backup file list 268 for snapshot files included in the most recent snapshot. In some embodiments, for each of the nodes 210 included in each of the selected availability zones 140, the file selection engine 270 also selects the entries in the backup file list 268 for incremental files created after the most recent snapshot. The file selection engine 270 then generates a view file list 278 that includes, without limitation, the selected entries. In alternate embodiments, and as depicted with a dashed arrow, the file selection engine 270 may identify and remove obsolete entries from the backup file list 268.

The compaction engine 280 retrieves the backup files specified in the entries included in the view file list 278 from the backup store(s) 150 and aggregates the data included in the retrieved backup files to generate aggregated data 282. As part of aggregating the data for a given node 210, the compaction engine 220 identifies and omits from the aggregated data 282 any replicas that are out-of-date. For example, based on the data included in the retrieved backup files for a given node 210, the compaction engine 280 could determine that the node 210 stores a current replica of a particular data item stored in the eventually consistent database instead of a previously-stored replica of the data item. The compaction engine 280 could then add the current replica of the data item, but not the previously-stored replica of the data item to the aggregated data 282.

The compaction engine 280 may identify any amount and/or type out-of-date data in any technically feasible fashion. For instance, in some embodiments, if different values for a replica are specified in a snapshot file for a given node 210 and a subsequent incremental file for the node 210, then the compaction engine identifies the value for the replica that is specified in the snapshot file as an out-of-date, previously-stored replica of the data item. In the same or other embodiments, if different values for a replica are specified in two incremental files for a given node, then the compaction engine identifies the value for the replica that is specified in the incremental file having the earlier timestamp as an out-of-date, previously-stored replica of the data item.

Notably, the aggregated data 282 includes, without limitation, multiple replicas of each of the data items that are stored in the source datacenter 272. For each data item, the compaction engine 280 determines a consistent data item (not shown) based on the replicas of the data item that are included in the aggregated data 282. Accordingly, each of the consistent data items is equal to at least one of the replicas of the associated data item. For each data item, the compaction engine 280 may perform any number and/or type of operations based on the replicas of the data item to determine the associated consistent data item.

In some embodiments, the compaction engine 280 identifies each data item for which the aggregated data 252 includes multiple replicas. For each identified data item, the compaction engine 280 emulates at least a portion of inconsistency resolution logic associated with the eventually consistent database to generate the associated consistent data item based on the multiple replicas of the data item that are included in the aggregated data 282. In some embodiments, the inconsistency resolution logic is implemented by at least one database management application to resolve inconsistencies between multiple replicas of a data item.

In some embodiments, to determine the consistent data item for a particular data item when the view type 256 is local, the compaction engine 280 selects the replicas of the data item that are specified in the aggregated data 282. If a majority of the selected replicas share the same value, then the compaction engine 280 sets the consistent data item equal to shared value. Otherwise, the compaction engine 280 sets the consistent data item equal to the value of the selected replica that was written to the eventually consistent database most recently.

For each data item, the compaction engine 280 removes the data from the aggregated data 282 that is associated with replicas having values that differ from the value of the associated consistent data item. The compaction engine 280 then removes any duplicated data from the aggregated data 282 to generate the compacted data 288. Accordingly, for each data item, the compacted data 288 specifies a single consistent data item instead of multiple replicas of the data item.

In alternate embodiments, the compaction engine 280 may generate the aggregated data 282 and/or the compacted data 288 in any technically feasible fashion. For instance, in alternate embodiments, the compaction engine 280 may resolve inconsistencies in the aggregated data 282 in any technically feasible fashion to generate the compacted data 288. As depicted with a dashed line, in some alternate embodiments, the compaction engine 280 uses the consistent view 190(V) as a starting-point when no snapshots have been taken since the previous checkpoint time 252.

The conversion engine 290 generates the consistent view 190(V+1) based on the compacted data 288. For each data item, the consistent view 190(V+1) specifies the consistent data item instead of multiple replicas of the data item. The conversion engine 290 may generate and/or optimize the consistent view 190(V+1) in any technically feasible fashion. In some embodiments, the conversion engine 290 organizes the data within the consistent view 190(V+1) to improve the efficiency of different types of queries and/or different types of tools.

For instance, in some embodiments, the conversion engine 290 may perform any number and type of conversion operations on the consistent data items to ensure that the resulting consistent view 190(V+1) is compatible with any number and type of big data tools, such as Hadoop, Hive, etc. In some alternate embodiments, and as depicted with a dashed line, the conversion engine 290 engine selects the consistent data items have changed since the consistent view 190(V). The conversion engine 290 then partitions the data within the consistent view 190(V+1) based on the selected consistent data items.

As shown, the conversion engine 290 stores the consistent view 190(V+1) in the repository 140. The consistency application 160 sets the previous checkpoint time 252 equal to the checkpoint time 254 and updates the checkpoint time 254. When the current time is equal to the checkpoint time 254, the file selection engine 270, the compaction engine 280, and the conversion engine 290 generate the consistent view 192(V+2). The consistency application 160 continues to generate new consistent views 192 in this fashion until the consistency application 160 is terminated or receives a command to stop.

Figure 3:
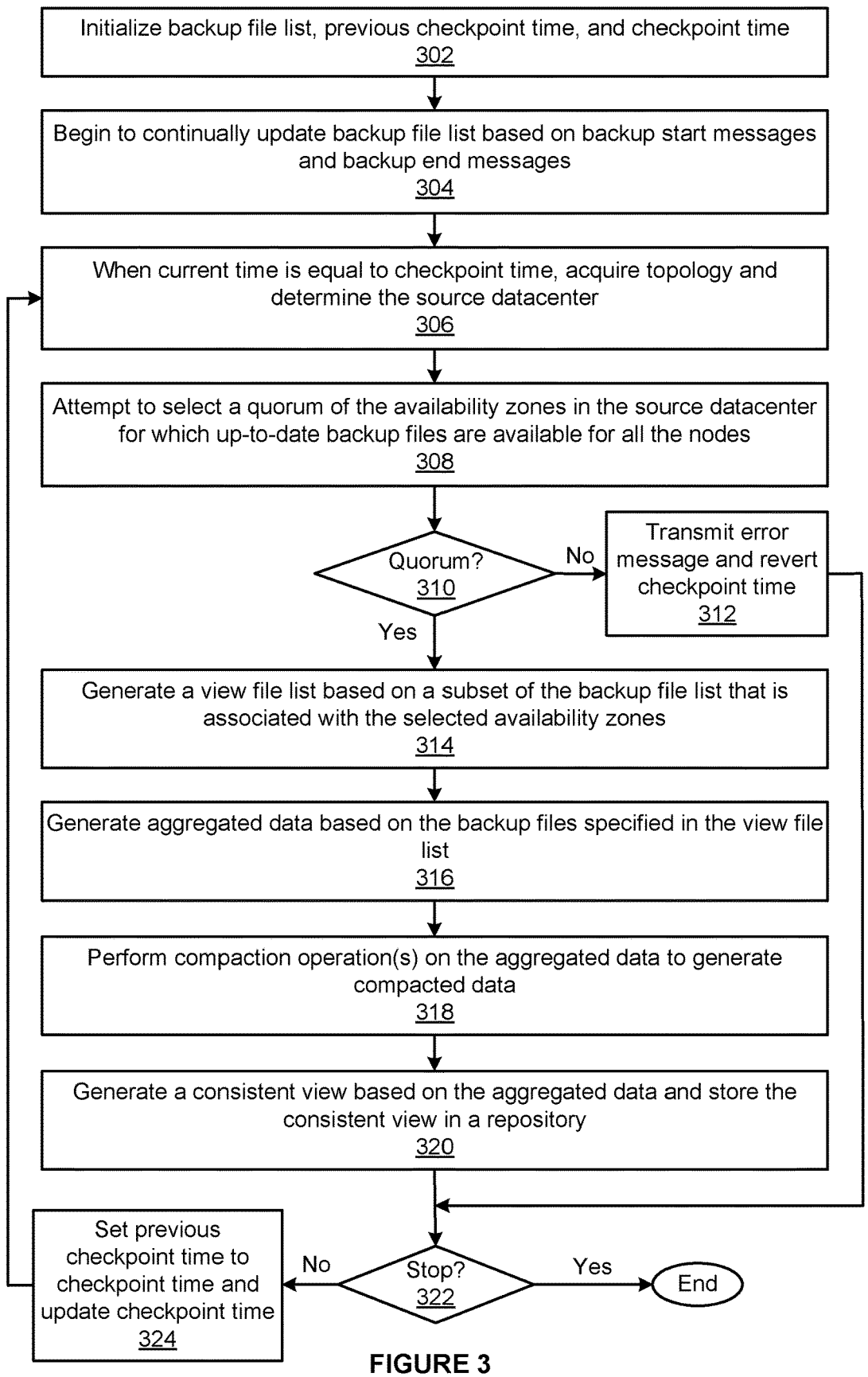
FIG. 3 is a flow diagram of method steps for constructing consistent views of an eventually consistent database, according to various embodiments.

FIG. 3 is a flow diagram of method steps for constructing consistent views of an eventually consistent database, according to various embodiments. Although the method steps are described with reference to the systems of FIGS. 1-2, persons skilled in the art will understand that any system configured to implement the method steps, in any order, falls within the scope of the present invention.

As shown, a method 300 begins a step 302, where the consistency application 160 initializes the backup file list 268, the previous checkpoint time 252, and the checkpoint time 254. At step 304, the tracking engine 260 begins to continually update the backup file list 268 based on the backup start messages 232 and the backup end messages 234. As described previously herein in conjunction with FIG. 2, the instances of the backup application 230 executing on the nodes 210 generate the backup start messages 232 and the backup end messages 234 to indicate the upload statuses of the backup files for each of the nodes 210.

At step 306, when the current time is equal to the checkpoint time 254, the file selection engine 270 acquires the topology 238 associated with the eventually consistent database from an instance of the backup application 230. The file selection engine 270 then determines the source datacenter 272 based on the topology 238, the datacenter preference list 258, and the backup file list 268. At step 308, the file selection engine 270 attempts to select a quorum of the availability zones 140 included in the source datacenter 272 for which up-to-date backup data is available for all the associated nodes 210.

As described previously herein in conjunction with FIG. 2, the number of the availability zones 140 that constitutes a quorum may be defined in any technically feasible fashion. For example, in some embodiments, the file selection engine 270 computes the number of the availability zones 140 that constitutes a quorum based on the topology 238 and the view type 256.

At step 310, the file selection engine 270 determines whether a quorum of the availability zones 140 is selected. If, at step 310, the file selection engine 270 determines that a quorum of the availability zones 140 is selected, then the method 300 proceeds directly to step 314. At step 314, the file selection engine 270 generates the view file list 278 based on a subset of the backup file list 268 that is associated with the selected availability zones 140.

At step 316, the compaction engine 280 generates the aggregated data 282 based on the backup files specified in the view file list 278. Notably, the aggregated data 282 includes multiple replicas for each of the data items stored in the eventually consistent database. At step 318, the compaction engine 280 performs one or more compaction operations on the aggregated data 282 to generate the compacted data 288 that includes consistent data items instead of multiple replicas of the associated data items. At step 320, the conversion engine 290 generates the consistent view 192 associated with the checkpoint time 254 based on the aggregated data 282 and then stores the consistent view 192 associated with the checkpoint time 254 in the repository 190.

Referring now to step 310, if the file selection engine 270 determines that a quorum of the availability zones 140 is not selected, then the method 300 proceeds to step 312. At step 312, the file selection engine 270 transmits the error message 298 to at least one software application. The error message 298 indicates that the required backup data was not available at the checkpoint time 254. As part of step 312, the file selection engine 270 also reverts the checkpoint time 254 (e.g., sets the checkpoint time 254 equal to the previous checkpoint time 252). The method 300 then proceeds directly to step 322.

At step 322, the consistency application 160 determines whether to stop generating the consistent views 192. The consistency application 160 may determine whether to stop generating the consistent views 192 in any technically feasible fashion. For instance, in some embodiments, the consistency application 160 determines to stop generating the consistent views 192 when the consistency application 160 receives an exit command from another software application or a user interface. If, at step 322, the consistency application 160 determines to stop generating the consistent views 192, then the method 300 terminates.

If, however, at step 322, the consistency application 160 does not determine to stop to stop generating the consistent views 192, then the method 300 proceeds to step 324. At step 324, the consistency application 160 sets the last checkpoint time 252 equal to the checkpoint time 252 and then updates the checkpoint time 252. The method 300 then returns to step 306 where, when the current time is equal to the checkpoint time 254, the file selection engine 270 acquires the topology 238 and determines the source datacenter 272. The method 300 continues to cycle through steps 306-324 until the consistency application 160 determines, at step 322, to stop generating the consistent views 192, In sum, the disclosed techniques can be used to accurately generate consistent views of an eventually consistent database at different points-in-time based on associated backup files. In some embodiments, each of multiple datacenters included in an eventually consistent database system includes, without limitation, multiple availability zones. Each availability zone stores a different replica of each of the data items stored in the eventually consistent database. A different instance of a backup application executes on each node and uploads backup files to a backup store that is not part of the eventually consistent database system. The backup files include, without limitation, snapshot files that specify the replicas stored in the node at associated timestamps and, optionally, incremental files that specify changes in the replicas stored in the node since the most recent backup (e.g., snapshot or incremental backup). Each instance of the backup application transmits backup start messages and backup end messages to a consistency application before and after, respectively uploading backup files to the associated backup store.

In some embodiments, the consistency application is configured to generate a new consistent view of the data items stored in the eventually consistent database at any number of checkpoint times (e.g., every hour). The consistency application includes, without limitation, a tracking engine, a file selection engine, a compaction engine, and a conversion engine. The tracking engine continually updates a backup file list based on the backup start messages and the backup end messages received from the various nodes. The backup file list specifies, without limitation, identifiers and timestamps for any number of snapshot files and any number of incremental files.

At the checkpoint time, the file selection engine obtains a topology associated with the eventually consistent database from one of the instances of the backup application. The topology specifies the hierarchical organization of the eventually consistent database. The file selection engine determines a source datacenter based on the backup file list and a datacenter preference list. Subsequently, the file selection engine attempts to select a quorum of the availability zones of the source datacenter for which up-to-date backup data is available for all the associated nodes. If the file selection engine does not select a quorum of the availability zones, then the file selection engine transmits an error message to any number of software applications and does not generate a consistent view at the checkpoint time.

If the file selection engine selects a quorum of the availability zones of the source datacenter, then the file selection engine generates a view file list based on the subset of the backup file list that is associated with the selected availability zones. The compaction engine generates aggregated data based on the backup files specified in the view file list. The compaction engine then performs any number of compaction operations (e.g., removing duplicates, resolving inconsistencies, etc.) on the aggregated data to generate compacted data. Subsequently, the conversion engine converts the compacted data into a consistent view. The conversion engine stores the consistent view in a repository that is accessible to any number and/or type of software applications.

At least one technical advantage of the disclosed techniques relative to the prior art is that the consistency application can be used to generate an accurate and consistent view of an eventually consistent database without negatively impacting latencies associated with accessing data items stored in the eventually consistent database. In that regard, because the consistency application generates a consistent view of the eventually consistent database based on associated backup files stored in storage resource(s) outside the eventually consistent database, the consistency application does not directly access the eventually consistent database itself. Therefore, unlike prior art techniques, generating the consistent view does not increase the latencies associated with accessing data items stored in the eventually consistent database. Further, the consistency application evaluates at least two replicas of each data item to determine which replica is the consistent data item that should be included in the consistent view of the eventually consistent database. The accuracy of the consistent view generated by the disclosed techniques is therefore increased relative to views generated by prior-art techniques that may include one or more inaccurate data item replicas. These technical advantages provide one or more technological advancements over prior art approaches.

1. In some embodiments, a computer-implemented method for constructing a consistent view of an eventually consistent database comprises determining a plurality of backup files associated with at least one datacenter included in the eventually consistent database, extracting aggregated data from the plurality of backup files, wherein the aggregated data includes at least two replicas of each data item included in a plurality of data items stored in the eventually consistent database, performing one or more compaction operations on the aggregated data to generate compacted data that includes a different consistent data item for each data item included in the plurality of data items, and generating the consistent view of the eventually consistent database based on the compacted data.

2. The computer-implemented method of clause 1, wherein a first backup file included in the plurality of backup files is associated with a first snapshot of a first node included in the at least one datacenter, and a second backup file included in the plurality of backup files is associated with a second snapshot of a second node included in the at least one datacenter.

3. The computer-implemented method of clauses 1 or 2, wherein a first backup file included in the plurality of backup files is associated with a snapshot of a first node included in the at least one datacenter, and a second backup file included in the plurality of backup files is associated with an incremental backup of the first node.

4. The computer-implemented method of any of clauses 1-3, wherein extracting the aggregated data comprises performing at least a first read operation on the plurality of backup files to determine that a first node included in the at least one datacenter stores a first replica of a first data item included in the plurality of data items, performing at least a second read operation on the plurality of backup files to determine that a second node included in the at least one datacenter stores a second replica of the first data item, and aggregating at least the first replica and the second replica to generate the aggregated data.

5. The computer-implemented method of any of clauses 1-4, wherein performing the one or more compaction operations comprises determining that the aggregated data includes at a first replica of a first data item included in the plurality of data items and a second replica of the first data item, determining that a first point-in-time associated with the first replica of the first data item is earlier than a second point-in-time associated with the second replica of the first data item, and setting a first consistent data item equal to the second replica of the first data item, and aggregating the first consistent data item and at least a second consistent data item associated with a second data item included in the plurality of data items to generate the compacted data.

6. The computer-implemented method of any of clauses 1-5, wherein performing the one or more compaction operations comprises determining that the aggregated data includes a plurality of replicas of a first data item included in the plurality of data items, determining that a quorum of the plurality of the replicas of the first data item share a first value for the first data item, generating a first consistent data item based on the first value, and aggregating the first consistent data item and at least a second consistent data item associated with a second data item included in the plurality of data items to generate the compacted data.

7. The computer-implemented method of any of clauses 1-6, wherein determining the plurality of backup files comprises receiving a plurality of messages from a plurality of instances of a backup application, wherein each instance of the backup application executes on a different node included in the at least one datacenter, and determining that the plurality of backup files is stored in a storage resource that is external to the eventually consistent database based on the plurality of messages.

8. The computer-implemented method of any of clauses 1-7, wherein determining the plurality of backup files comprises selecting a subset of nodes included in the at least one datacenter based on a topology of the eventually consistent database and a consistency criterion, and adding at least one backup file for each node included in the subset of nodes to the plurality of backup files.

9. The computer-implemented method of any of clauses 1-8, wherein the eventually consistent database is associated with both a first geographical region and a second geographical region, and the consistent view is consistent across at least one of the first geographical region or the second geographical region.

10. The computer-implemented method of any of clauses 1-9, wherein generating the consistent view comprises converting the compacted data into a format that is compatible with at least one big data tool.

11. In some embodiments, one or more non-transitory computer readable media include instructions that, when executed by one or more processors, cause the one or more processors to construct a consistent view of an eventually consistent database by performing the steps of determining a plurality of backup files associated with a plurality of availability zones included in the eventually consistent database, extracting aggregated data from the plurality of backup files, wherein the aggregated data includes at least two replicas of each data item included in a plurality of data items stored in the eventually consistent database, performing one or more compaction operations on the aggregated data to generate compacted data that includes a different consistent data item for each data item included in the plurality of data items, and generating the consistent view of the eventually consistent database based on the compacted data.

12. The one or more non-transitory computer readable media of clause 11, wherein a first backup file included in the plurality of backup files is associated with a first snapshot of a first node included in the plurality of availability zones, and a second backup file included in the plurality of backup files is associated with a second snapshot of a second node included in the plurality of availability zones.

13. The one or more non-transitory computer readable media of clauses 11 or 12, wherein a first backup file included in the plurality of backup files is associated with a snapshot of a first node included in the plurality of availability zones, and a second backup file included in the plurality of backup files is associated with an incremental backup of the first node.

14. The one or more non-transitory computer readable media of any of clauses 11-13, wherein extracting the aggregated data comprises determining that a first node included in the plurality of availability zones stores a current replica of a first data item included in the plurality of data items instead of a previously-stored replica of the first data item, and adding the current replica of the first data item, but not the previously-stored replica of the first data item, to the aggregated data.

15. The one or more non-transitory computer readable media of any of clauses 11-14, wherein performing the one or more compaction operations comprises determining that the aggregated data includes at a first replica of a first data item included in the plurality of data items and a second replica of the first data item, determining that a first point-in-time associated with the first replica of the first data item is earlier than a second point-in-time associated with the second replica of the first data item, and setting a first consistent data item equal to the second replica of the first data item, and aggregating the first consistent data item and at least a second consistent data item associated with a second data item included in the plurality of data items to generate the compacted data.

16. The one or more non-transitory computer readable media of any of clauses 11-15, wherein performing the one or more compaction operations comprises determining that the aggregated data includes a plurality of replicas of a first data item included in the plurality of data items, emulating at least a portion of inconsistency resolution logic associated with the eventually consistent database to generate a first consistent data item for the first data item based on the plurality of replicas of the first data item, and aggregating the first consistent data item and at least a second consistent data item associated with a second data item included in the plurality of data items to generate the compacted data.

17. The one or more non-transitory computer readable media of any of clauses 11-16, wherein determining the plurality of backup files comprises receiving a plurality of messages from a plurality of instances of a backup application, wherein each instance of the backup application executes on a different node included in the plurality of availability zones, and determining that the plurality of backup files is stored in a storage resource that is external to the eventually consistent database based on the plurality of messages.

18. The one or more non-transitory computer readable media of any of clauses 11-17, wherein determining the plurality of backup files comprises determining that complete backup data is available for a first availability zone included in the plurality of availability zones, and adding at least one backup file for each node include in the first availability zone to the plurality of backup files.

19. The one or more non-transitory computer readable media of any of clauses 11-18, wherein generating the consistent view comprises converting the compacted data into a format that is compatible with at least one big data tool.

20. In some embodiments, a system comprises one or more memories storing instructions, and one or more processors coupled to the one or more memories that, when executing the instructions, perform the steps of determining a plurality of backup files associated with at least one datacenter included in an eventually consistent database, extracting aggregated data from the plurality of backup files, wherein the aggregated data includes at least two replicas of each data item included in a plurality of data items stored in the eventually consistent database, resolving one or more inconsistencies in the aggregated data to generate compacted data that includes a different consistent data item for each data item included in the plurality of data items, and generating a consistent view of the eventually consistent database based on the compacted data.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory, a Flash memory, an optical fiber, a portable compact disc read-only memory, an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for constructing a consistent view of an eventually consistent database, the method comprising:
    identifying, by a consistency application external to the eventually consistent database, a subset of nodes included in a first datacenter that are associated with up-to-date backup files, wherein identifying the subset of nodes comprises:
        determining one or more zones included in the first data center based on a topology specifying an organization of zones and nodes within the eventually consistent database, and
        selecting, based on the one or more zones and a consistency criterion specifying a minimum number of zones, a quorum of zones that includes the subset of nodes;
    retrieving, by the consistency application from one or more first storage resources, a plurality of backup files associated with the subset of nodes, wherein the one or more first storage resources are external to the eventually consistent database, and wherein the one or more first storage resources store a plurality of data items stored in the eventually consistent database in one or more snapshots of nodes in the eventually consistent database;
    extracting aggregated data from the plurality of backup files, wherein the aggregated data includes at least two replicas of each data item included in a plurality of data items;
    performing one or more compaction operations on the aggregated data to generate compacted data that includes a different consistent data item for each data item included in the plurality of data items;
    generating, based on the compacted data, the consistent view of the eventually consistent database; and
    storing the consistent view in one or more second storage resources that are external to the eventually consistent database.

2. The computer-implemented method of claim 1, wherein:
    a first backup file included in the plurality of backup files is associated with a first snapshot of a first node included in the subset of nodes, and
    a second backup file included in the plurality of backup files is associated with a second snapshot of a second node included in the subset of nodes.

3. The computer-implemented method of claim 1, wherein:
    a first backup file included in the plurality of backup files is associated with a snapshot of a first node included in the subset of nodes, and
    a second backup file included in the plurality of backup files is associated with an incremental backup of the first node.

4. The computer-implemented method of claim 1, wherein extracting the aggregated data comprises:
performing at least a first read operation on the plurality of backup files to determine that a first node included in the first datacenter stores a first replica of a first data item included in the plurality of data items;
performing at least a second read operation on the plurality of backup files to determine that a second node included in the subset of nodes stores a second replica of the first data item; and
aggregating at least the first replica and the second replica to generate the aggregated data.

5. The computer-implemented method of claim 1, wherein performing the one or more compaction operations comprises:
determining that the aggregated data includes (i) a first replica of a first data item included in the plurality of data items, and (ii) a second replica of the first data item;
determining that a first point-in-time associated with the first replica of the first data item is earlier than a second point-in-time associated with the second replica of the first data item;
setting a first consistent data item equal to the second replica of the first data item; and
aggregating the first consistent data item and at least a second consistent data item associated with a second data item included in the plurality of data items to generate the compacted data.

6. The computer-implemented method of claim 1, wherein performing the one or more compaction operations comprises:
determining that the aggregated data includes a plurality of replicas of a first data item included in the plurality of data items;
determining that a quorum of the plurality of the replicas of the first data item share a first value for the first data item;
generating a first consistent data item based on the first value; and
aggregating the first consistent data item and at least a second consistent data item associated with a second data item included in the plurality of data items to generate the compacted data.

7. The computer-implemented method of claim 1, wherein the plurality of backup files are specified in a backup list, and the method further comprises:
receiving, from a plurality of instances of a backup application, a plurality of messages, wherein each instance of the backup application executes on a different node included in the first datacenter;
updating the backup list based on the plurality of messages; and
determining, based on the backup list, that the plurality of backup files is stored in the one or more first storage resources.

8. The computer-implemented method of claim 1, wherein retrieving the plurality of backup files comprises adding at least one backup file for each node included in the subset of nodes to the plurality of backup files.

9. The computer-implemented method of claim 1, wherein the eventually consistent database is associated with both a first geographical region and a second geographical region, and the consistent view is consistent across at least one of the first geographical region or the second geographical region.

10. The computer-implemented method of claim 1, wherein generating the consistent view comprises converting the compacted data into a format that is compatible with at least one big data tool.

11. One or more non-transitory computer readable media including instructions that, when executed by one or more processors, cause the one or more processors to construct a consistent view of an eventually consistent database by performing the steps of:
identifying, by a consistency application external to the eventually consistent database, a subset of nodes included in a first datacenter that are associated with up-to-date backup files, wherein identifying the subset of nodes comprises:
determining one or more zones included in the first data center based on a topology specifying an organization of zones and nodes within the eventually consistent database, and
selecting, based on the one or more zones and a consistency criterion specifying a minimum number of zones, a quorum of zones that includes the subset of nodes;
retrieving, by the consistency application from one or more first storage resources, a plurality of backup files associated with the subset of nodes, wherein the one or more first storage resources are external to the eventually consistent database, and wherein the one or more first storage resources store a plurality of data items stored in the eventually consistent database in one or more snapshots of nodes in the eventually consistent database;
extracting aggregated data from the plurality of backup files, wherein the aggregated data includes at least two replicas of each data item included in a plurality of data items;
performing one or more compaction operations on the aggregated data to generate compacted data that includes a different consistent data item for each data item included in the plurality of data items;
generating, based on the compacted data, the consistent view of the eventually consistent database; and
storing the consistent view in one or more second storage resources that are external to the eventually consistent database.

12. The one or more non-transitory computer readable media of claim 11, wherein:
a first backup file included in the plurality of backup files is associated with a first snapshot of a first node included in the subset of nodes, and
a second backup file included in the plurality of backup files is associated with a second snapshot of a second node included in the subset of nodes.

13. The one or more non-transitory computer readable media of claim 11, wherein:
a first backup file included in the plurality of backup files is associated with a snapshot of a first node included in the subset of nodes, and
a second backup file included in the plurality of backup files is associated with an incremental backup of the first node.

14. The one or more non-transitory computer readable media of claim 11, wherein extracting the aggregated data comprises:
determining that a first node included in the subset of nodes stores a current replica of a first data item included in the plurality of data items instead of a previously-stored replica of the first data item; and adding the current replica of the first data item, but not the previously-stored replica of the first data item, to the aggregated data.

15. The one or more non-transitory computer readable media of claim 11, wherein performing the one or more compaction operations comprises:

determining that the aggregated data includes (i) a first replica of a first data item included in the plurality of data items, and (ii) a second replica of the first data item;

determining that a first point-in-time associated with the first replica of the first data item is earlier than a second point-in-time associated with the second replica of the first data item;

setting a first consistent data item equal to the second replica of the first data item; and aggregating the first consistent data item and at least a second consistent data item associated with a second data item included in the plurality of data items to generate the compacted data.

16. The one or more non-transitory computer readable media of claim 11, wherein performing the one or more compaction operations comprises:

determining that the aggregated data includes a plurality of replicas of a first data item included in the plurality of data items;

emulating at least a portion of inconsistency resolution logic associated with the eventually consistent database to generate a first consistent data item for the first data item based on the plurality of replicas of the first data item; and aggregating the first consistent data item and at least a second consistent data item associated with a second data item included in the plurality of data items to generate the compacted data.

17. The one or more non-transitory computer readable media of claim 11, wherein the plurality of backup files are specified in a backup list, and the steps further comprise:

receiving, from a plurality of instances of a backup application, a plurality of messages, wherein each instance of the backup application executes on a different node included in the first datacenter; and determining, based on the plurality of messages, that the plurality of backup files is stored in the one or more first storage resources.

18. The one or more non-transitory computer readable media of claim 11, wherein retrieving the plurality of backup files comprises adding at least one backup file for each node included in the subset of nodes to the plurality of backup files.

19. The one or more non-transitory computer readable media of claim 11, wherein generating the consistent view comprises converting the compacted data into a format that is compatible with at least one big data tool.

20. A system comprising:

one or more memories storing instructions; and one or more processors coupled to the one or more memories that, when executing the instructions, perform the steps of:

identifying, by a consistency application external to an eventually consistent database, a subset of nodes included in a first datacenter that are associated with up-to-date backup files, wherein identifying the subset of nodes comprises:

determining one or more zones included in the first data center based on a topology specifying an organization of zones and nodes within the eventually consistent database, and selecting, based on the one or more zones and a consistency criterion specifying a minimum number of zones, a quorum of zones that includes the subset of nodes;

retrieving, by the consistency application from one or more first storage resources, a plurality of backup files associated with the subset of nodes, wherein the one or more first storage resources are external to the eventually consistent database, and wherein the one or more first storage resources store a plurality of data items stored in the eventually consistent database in one or more snapshots of nodes in the eventually consistent database;

extracting aggregated data from the plurality of backup files, wherein the aggregated data includes at least two replicas of each data item included in a plurality of data items;

resolving one or more inconsistencies in the aggregated data to generate compacted data that includes a different consistent data item for each data item included in the plurality of data items;

generating, based on the compacted data, a consistent view of the eventually consistent database; and storing the consistent view in one or more second storage resources that are external to the eventually consistent database.

* * * * *